United States Patent [19]

Demopoulos

[11] Patent Number: 5,454,622
[45] Date of Patent: Oct. 3, 1995

[54] VEHICLE SEATS

[75] Inventor: Andreas Demopoulos, Leighton Buzzard, England

[73] Assignee: Flight Equipment & Engineering Limited, Bedforshire, United Kingdom

[21] Appl. No.: 366,374

[22] Filed: Dec. 29, 1994

Related U.S. Application Data

[63] Continuation of Ser. No. 97,216, Jul. 27, 1993, abandoned.

[30] Foreign Application Priority Data

July 30, 1992 [UK] United Kingdom .................. 9216245

[51] Int. Cl.$^6$ ..................................................... B60N 2/42
[52] U.S. Cl. ............... 297/216.14; 188/374; 297/378.11; 297/216.1
[58] Field of Search .............. 297/216.1, 216.13, 297/216.14, 216.20, 362.13, 378.1, 378.11, 452.24, 216.17; 188/371, 374, 377

[56] References Cited

U.S. PATENT DOCUMENTS

| | | | |
|---|---|---|---|
| 2,682,931 | 7/1954 | Young | 297/216.2 X |
| 3,354,990 | 11/1967 | Stahl | 297/216.17 X |
| 3,524,678 | 8/1970 | De Lavenne | 297/216.2 |
| 3,532,379 | 10/1970 | Reilly et al. | 297/216.17 |
| 3,697,128 | 10/1972 | Strien et al. | 297/216.2 |
| 3,968,993 | 7/1976 | Doyle | 297/362.13 |
| 4,366,904 | 1/1983 | Klueting et al. | 297/378.11 |
| 4,394,047 | 7/1983 | Brunelle | 297/378.1 X |
| 4,523,730 | 6/1985 | Martin | 297/216.17 X |
| 4,643,480 | 2/1987 | Morita | 297/218 X |
| 5,248,271 | 9/1993 | Boisset | 297/362.13 |

*Primary Examiner*—Peter R. Crown
*Attorney, Agent, or Firm*—Watson, Cole, Grindle & Watson

[57] ABSTRACT

A vehicle seat having a backrest part hingedly connected to the frame so as to break forwardly about the hinged connection from a normal substantially upright position includes a braking device for preventing forward movement of the backrest part about the hinged connection under forces equivalent to less than a predetermined maximum forward force applied to the top of the backrest part but to permit forward movement of the backrest part under greater forces against a reaction provided by the braking device. The backrest part is preferably so constructed that no significant force may be applied to it by the knees of a passenger in a seat immediately behind. For example it may have an aperture in the region which will be immediately in front of the knees of a passenger occupying a seat immediately behind. The aperture may be covered on the front and/or back of the backrest part by light surface element, capable of deformation, detachment or fracture under impact from the knees of a passenger to enable them to pass through the aperture without applying significant force to the backrest part.

19 Claims, 3 Drawing Sheets

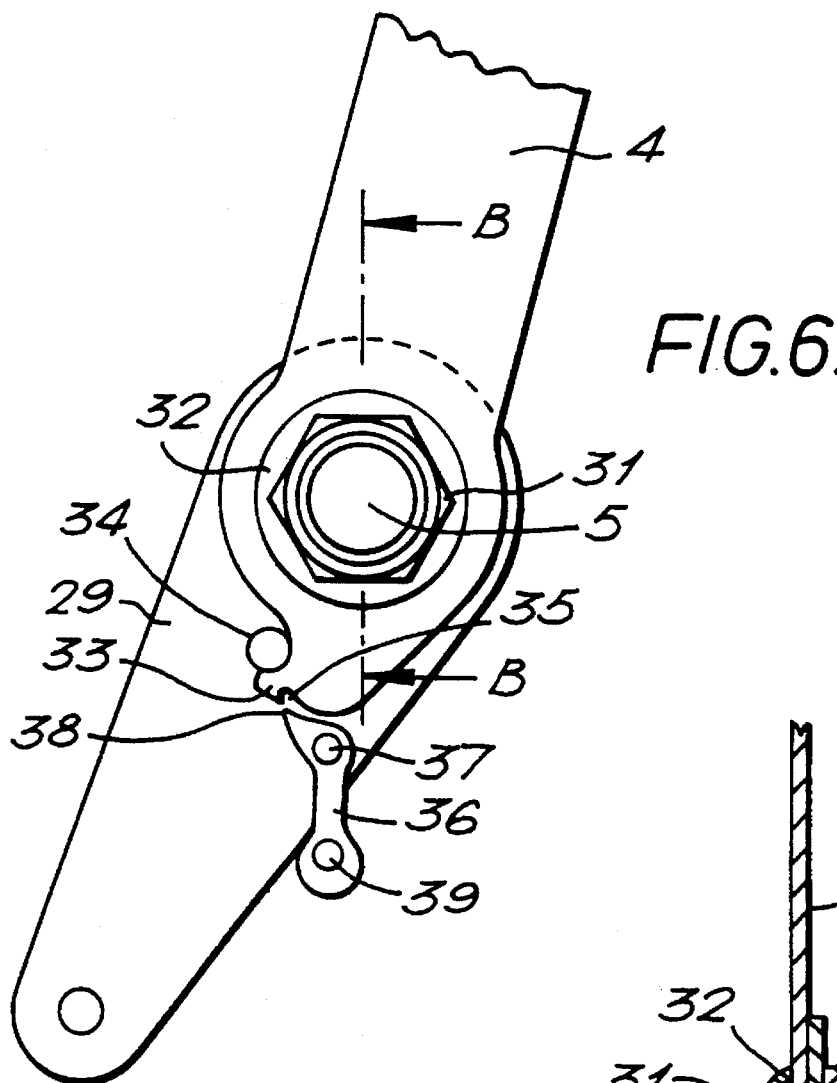
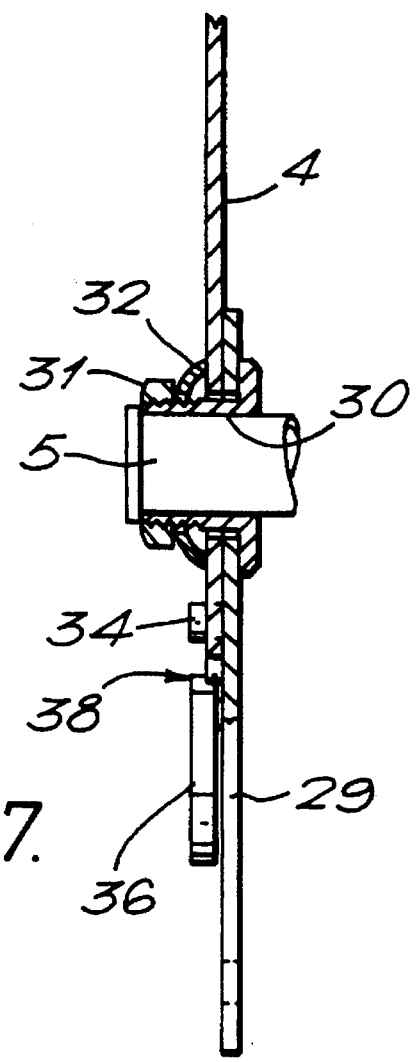

VEHICLE SEATS

This is a Continuation of application Ser. No. 08/097,216 filed Jul. 27, 1993, now abandoned.

TECHNICAL FIELD

Vehicle seats which are arranged in forwardly-facing rows are commonly made so that each backrest can be folded forwardly about a hinge joint adjacent to the seat bottom. This is to facilitate transport of seating units and it has also been thought to contribute to the safety of passengers since in the event of a crash a passenger was thought likely to be thrown forwardly so that his head would strike the backrest of the seat in front. It was thought that if the backrest folded (or "broke") forwardly about the hinge joint when struck by the passenger's head that would reduce the impact. Seats for use in passenger aircraft are commonly adjusted so that a backrest will fold (or "break") forwardly when a load equivalent to about 14 kg. applied to the top of the backrest is applied in a forward direction.

BACKGROUND TO THE INVENTION

Our research indicates that this arrangement actually does not improve passenger safety in a high speed vehicle crash in which forward motion of the vehicle is rapidly decelerated, such as an aircraft crash. We have found that in such a crash the first contact of a passenger thrown forwardly against the backrest of the seat in front is likely to be with the knees and/or hands and that the force thereby applied, together with the inertia of the backrest itself, is likely to be sufficient to cause it to break forwardly. That creates a larger space in which the head of the passenger can move forwardly with acceleration. The backrest will be stopped by striking a passenger (if present) occupying that seat in front or on reaching the end of its possible travel and there will then be a much more severe impact when the passenger's head strikes the backrest. We believe that the creation of that larger space and the resultant acceleration of passengers' heads is the cause of many head injuries in survivable crashes. This invention aims to reduce or eliminate that space.

DISCLOSURE OF THE INVENTION

According to this invention a vehicle seat comprising a frame for mounting in a vehicle, a seat bottom part mounted on the frame and a backrest part hingedly connected to the frame adjacent to the seat bottom so as to break forwardly about the hinged connection from a normal position includes braking means for preventing forward movement of the backrest part about the hinged connection under forces equivalent to less than a predetermined maximum forward force applied to the top of the backrest part but to permit forward movement of the backrest part about the hinged connection under greater forces against a reaction provided by the braking means.

By a "normal" position of the backrest part is meant a substantially upright position like an ordinary chair backrest or a reclined position inclined rearwardly from such an upright position, such as is commonly provided for in vehicle seats.

The predetermined maximum forward force is calculated to be substantially in excess of a reference force which would produce a moment about the hinged connection equal to the maximum moment likely to be produced by the knees and/or hands of a passenger making initial contact with the backrest part when a crash occurs, as described above. Typically it may be twice or three times that reference force.

With this arrangement, the initial contact of the knees and/or hands of a passenger with the backrest part in a crash is unlikely to cause the backrest part to break forwardly, so no larger space is created for accelerating forward movement of the passenger's head. Whilst the passenger's head is likely to strike the backrest part earlier than with conventional arrangements, it will be travelling at a lower speed relative to the backrest part because of the shorter distance travelled and the risk of serious injury will be reduced.

The braking means may be combined with recline control means such as is commonly provided in vehicle seats to enable a passenger in a seat to adjust the angular position of the backrest part relative to the seat bottom part about the hinged connection.

Preferably the braking means is arranged to provide a progressively increasing reaction as the permitted forward movement of the backrest part proceeds. Then the passenger's head will be decelerated progressively once it has struck the backrest part, further reducing the risk of serious injury.

Further, according to the invention, a vehicle seat comprising a frame for mounting in a vehicle, a seat bottom part mounted on the frame and a backrest part hingedly connected to the frame adjacent to the seat bottom so as to break forwardly about the hinged connection from a normal position includes braking means for preventing forward movement of the backrest part about the hinged connection under forces equivalent to less than a predetermined maximum forward force applied to the top of the backrest part but to permit forward movement of the backrest part about the hinged connection under greater forces against a reaction provided by the braking means which increases progressively as the permitted forward movement of the backrest part proceeds, the said braking means being combined with the usual recline control means which enables a passenger in the seat to adjust the angular position of the backrest part relative to the seat bottom part about the hinged connection, and a locking device to prevent any further forward movement of the backrest part after it has been returned to its normal position after permitted forward movement.

The backrest part my be and preferably is so constructed that no significant force may be applied to it in a forward direction in the region which will be immediately in front of the knees of a passenger properly seated in a seat immediately behind. That may be achieved most simply by providing an aperture in that region so that in the event of very rapid deceleration such as occurs in a crash the knees of a passenger occupying a seat immediately behind do not contact the backrest part, but pass into the aperture and strike the rear of the seat bottom, which may be suitably padded to reduce the risk of injury to the knees. However, providing an open aperture may be aesthetically undesirable, so an aperture may be provided only in the inner structure of the backrest part and be covered, particularly on the front and/or back of the backrest part, by light surface element, capable of deformation or fracture under impact from the knees of a passenger to enable them to pass through the aperture without applying significant force to the backrest part.

The seat may include a connecting device between the braking means and the backrest part, either capable of disconnection when required or normally disconnected so that the backrest part may fold forwardly about the said connection in the usual way, but operative automatically under abnormal forward deceleration to connect the braking means to the backrest part.

The braking means is preferably arranged so as not to resist significantly the return of the backrest part to its normal substantially upright position after it has broken forwardly under a force equivalent to a force applied to its top greater than the said predetermined maximum forward force and may include a locking device to prevent any further forward movement of the backrest part after it has been returned to that normal position. This may be of particular importance for a seat which is located alongside an emergency escape door or window which might be obstructed by the forwardly-folded backrest part.

BRIEF DESCRIPTION OF THE DRAWINGS

Embodiments of the invention are illustrated by way of example by the accompanying drawings, in which:

FIG. 6 is a side elevation of an inertia-operated locking device which may be included in the seat shown in FIGS. 1 and 2, and FIG. 7 is a section on the line B—B of FIG. 6.

BEST MODE FOR CARRYING OUT THE INVENTION

Figure 1:
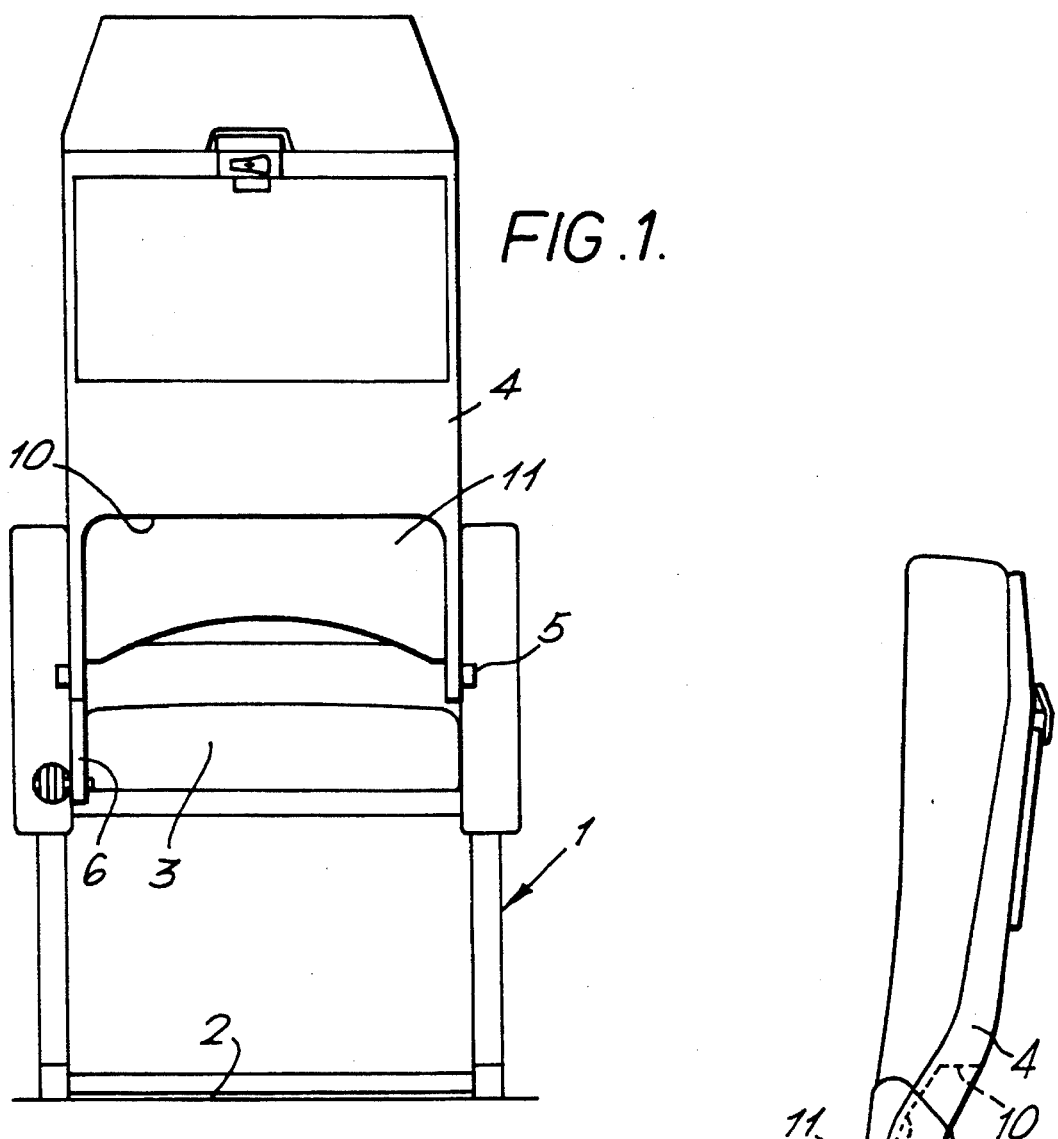
FIG. 1 is a rear elevation of a seat.
Figure 2:
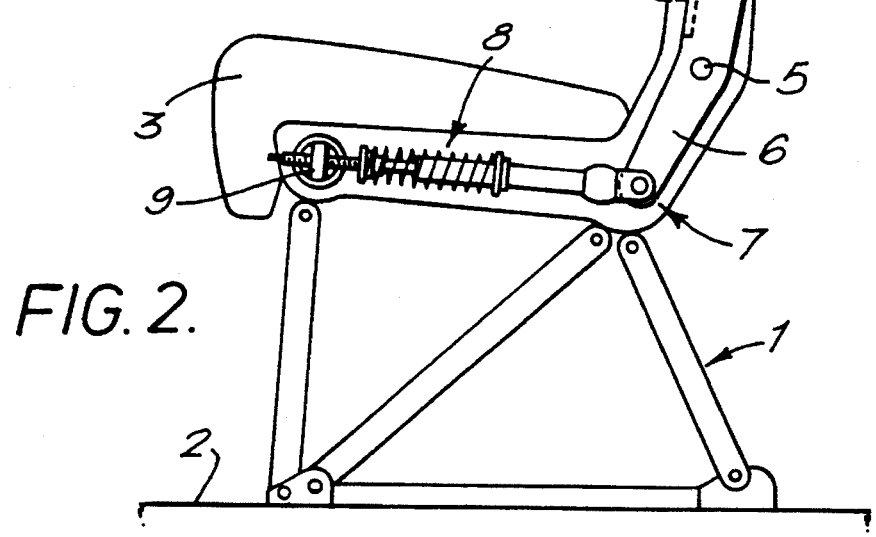
FIG. 2 is a side elevation of the seat.

The seat shown in FIGS. 1 and 2 comprises a frame 1 designed to be secured to the floor 2 of a vehicle, such as a passenger aircraft, supporting a seat bottom part 3 which is upholstered as usual and a backrest part 4, hingedly connected to the frame 1 at each side by aligned pivot pins 5. An extension piece 6 is secured to one side of the backrest part 4 and extends beyond the pivot pin 5 on that side. The end of the extension is pivotally connected at 7 to the end of a braking device 8, the other end of which is adjustably connected to a lug 9 which is rotatably mounted on the frame 1.

An aperture 10 is formed in the lower portion of the backrest part 4 which will be directly in front of the knees of a passenger in a seat immediately behind. The aperture 10 is covered by a light surface element 11, continuous with the front surface of the remainder of the backrest part, capable of deformation, detachment or fracture under impact from the knees of a passenger to enable them to pass through the aperture without applying significant force to the backrest part.

Figure 3:
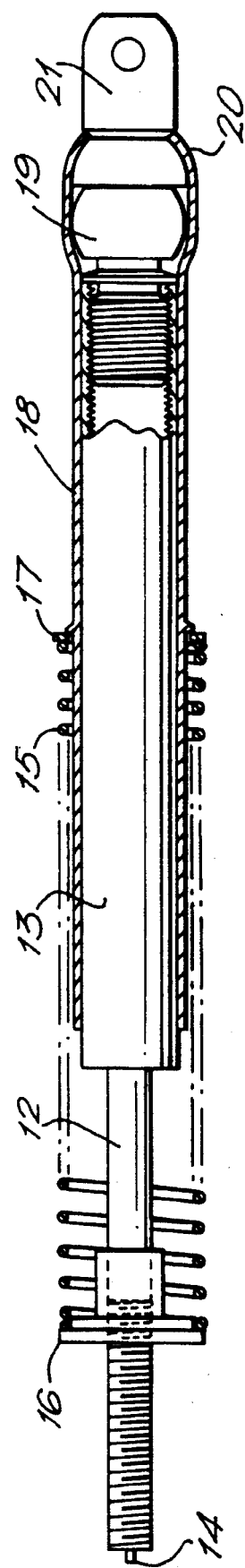
FIG. 3 shows details of a braking device combined with a recline control device which is included in the seat shown in FIGS. 1 and 2.

Details of the braking device 8 are shown in FIG. 3. It includes the usual pneumatic or hydraulic recline control device comprising telescopic tubular parts 12 and 13 for controlling reclining movement of the backrest part 4 relative to the frame 1. A valve control member 14 at the end of the part 12 can be operated by a passenger occupying the seat to permit relative longitudinal movement between the parts 12 and 13. To recline the backrest part 4, the passenger operates the valve control member 14 and applies a rearward force against the backrest part with his back. The part 13 slides longitudinally over the part 12 until the control member 14 is released, whereupon the parts 12 and 13 are locked in their new relative position, holding the backrest part 4 in the reclined position chosen by the passenger. A compression spring 15 surrounds the parts 12 and 13, engaging abutments 16 and 17 to urge the part 13 longitudinally rearwardly with respect to the part 12 which is fixed to the frame 1. If the passenger operates the control member 14 without applying a rearward force to the backrest part, the spring will cause the part 13 to move rearwardly with respect to the part 12, causing the backrest part 4 to rotate about the pivot pins 5 towards an upright position. The construction and operation of these parts is well know and will not be described further.

The end of the part 13 enters a tube 18 and is connected by screw threads to a member having a ball-like head 19 which is of diameter somewhat larger than the internal diameter of the tube 18 and is accommodated in an enlarged part 20 at the end of the tube 18. The enlarged part 20 is clenched over a clevis part 21 by which the braking device 8 is connected to the end 7 of the extension 6 (see FIG. 2).

As described, under normal circumstances the recline control device in the braking device 8 operates in the usual way. However, if a forward force is applied to the backrest part 4 above the pivot pins 5 it can be seen from FIG. 2 that the effect will be to pull the tube 18 rearwardly against the ball-like head 19, which is anchored by the tubes 13 and 12 to the frame lug 9. If the force is sufficient, the head 19 will cause the part of the tube 18 immediately adjacent to the enlarged part 20 to expand. If the sufficient force is maintained, the tube 18 will ride over the head 19, being progressively expanded. Such a sufficient force might be applied in the event of a crash by the head of a passenger in the seat immediately behind striking the backrest part 4. The riding of the tube 18 over the ball-like head 19 and its expansion has a braking effect on the backrest part 4. Thus the impact of the passenger's head with the backrest part will be reduced in comparison with that which occurs in a seat with conventional break-forward arrangement of the backrest. The passenger's head will be brought gradually to rest instead of being suddenly stopped. The material, wall thickness and diameter of the tube 18 and the diameter of the ball-like head 19 are selected so that the force necessary to expand the tube and draw it over the ball-like head produces a moment about the pivot pins 5 equal to the said predetermined maximum forward force applied to the top of the backrest. The wall thickness may be varied to produce a varying braking force as forward movement of the backrest part 4 proceeds. For example, to provide a gradually increasing braking force, the wall thickness of the tube 18 may be increased progressively along its length from the enlarged part 20.

Figure 5:
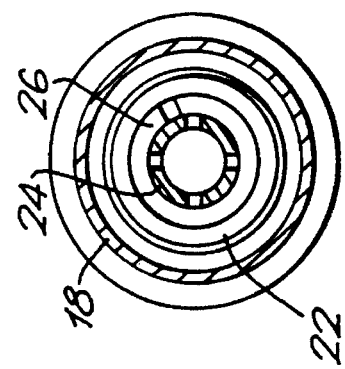
FIG. 5 is a sectional view on the line A—A of FIG. 4.
Figure 4:
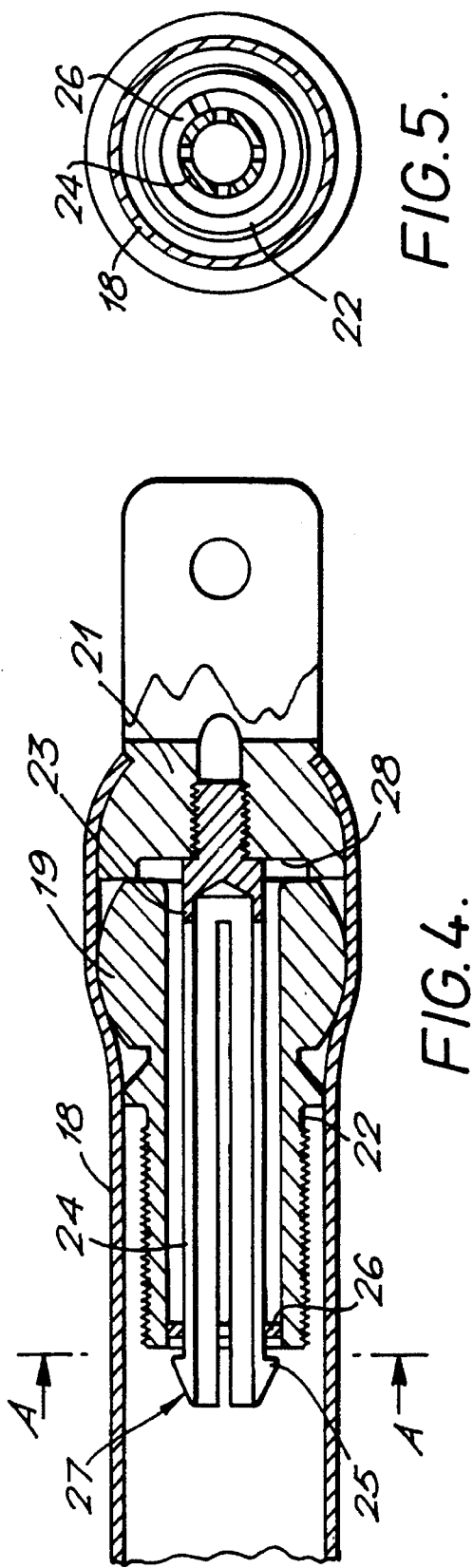
FIG. 4 is a sectional view showing a detail of an alternative braking device which may be included in the seat shown in FIGS. 1 and 2.

Once the backrest part 4 has been brought to rest in a forwardly-inclined position by the braking device or because it has reached the end of its permitted rotation, it may be moved back to its upright position by applying a rearward force to its upper end, causing the ball-like head 19 to move towards the clevis part 21. As the tube 18 has been expanded, the braking device 8 provides no significant resistance to such return movement. For the same reason, the backrest part could then be folded forwardly again without significant resistance and may tend to remain in the forward position. That may be unsatisfactory, particularly for a seat adjacent to an emergency exit from a vehicle, since it might impede access to the exit. FIGS. 4 and 5 show a modification of the braking device 8 to avoid this.

In the modified braking device most of the parts are identical to those shown in FIG. 3, are identified by identical reference numbers and perform identical functions. However, the member having the ball-like head 19 is replaced by a tubular member 22 having a ball-like head 19 and a split tubular locking device 23 is secured to the clevis member 21 and extends coaxially through the tubular member 22. The tubular locking device is split throughout the major part of its length on two perpendicular diameters (see FIG. 5) to provide four prongs 24 which are just longer than the tubular member 22 and somewhat enlarged at their ends to provide locking parts 25. As manufactured, the prongs are biased outwardly from the position shown so that their locking parts 25 lie on a diameter greater than the internal diameter of the tubular member 22, but when assembled they are held in to a smaller diameter by a split spring circlip 26, of normal diameter greater than that internal diameter, fitted within the tubular member 22 near its end remote from the clevis member 21. The outer surfaces of the locking parts 25 are chamfered as shown at 27 for a purpose to be described.

In the event of sufficient forward force being applied to the backrest part 4, it can be swung forwardly about the pivot pins 5, drawing the tube 18 over the ball-like head of the tubular member 22 and expanding the tube as previously described. As the clevis member 21 draws the tube over the ball-like head, it also withdraws the split tubular locking device out of the tubular member 22, carrying with it the split circlip 26. When the circlip 26 is completely withdrawn from the tubular member 22 it is free to expand and allow the prongs 24 also to expand due to their outward bias.

If the backrest part is then moved towards its upright position, the ball-like head of the tubular member 22 can move back into the tube 18 without significant resistance. When it strikes the enlarged ends 25 of the prongs 24, their chamfered outer surfaces 27 will cause them to be compressed radially so that they re-enter the ball-like head. However, the split circlip, having expanded, will be struck by the end of the ball-like head and be driven along the split tubular locking device 23 into a recess 28 provided in the end of the clevis member 21 to receive it. The prongs 24, no longer being constrained by the circlip 26, are free to expand as soon as their enlarged ends 25 project from the end of the tubular member 22 and they then lock behind its end, so locking the tubular member 22 to the clevis member 21 and preventing the backrest part 4 being moved forwardly again.

The invention is not limited to the use of braking devices as shown in FIGS. 3, 4 and 5. Many other forms of braking device could be used.

The braking device is required only in the event of a crash in which forward motion of the vehicle is rapidly decelerated, such as an aircraft crash, but its presence in the arrangement shown in FIGS. 1 and 2 prevents the usual provision for the backrest part 4 to break forwardly about the pivot pins 5 except under forces greater than a force equivalent to the pre-determined maximum forward force. That may be undesirable and FIGS. 6 and 7 show an inertia-operated connecting device between the braking device and the backrest part 4. In place of the extension piece 6 at one side of the backrest part 4 as shown in FIGS. 1 and 2 a separate element 29 is mounted on the pivot pin 5 at one side, to rotate about the pivot pin independently of the backrest part 4. A screw-threaded sleeve 30 fitted on the pin 5 and nut 31 compress a domed washer 32 to provide a frictional resistance to the break-forward movement. The nut may be adjusted to allow movement when a predetermined force, say 14 kg., is applied to the top of the backrest part. The end of the backrest part 4 is formed with a hook 33 to engage a pin 34 secured to the element 29 so that reclining movement of the backrest part will be controlled by the usual pneumatic or hydraulic device as previously described. The hook 33 also has a reverse hook recess 35. A pivotal locking element 36 is connected to the element 29 so as to swing freely about a pin 37. The locking element illustrated is designed for inertia operation and has a nose 38, positioned to be just clear of the reverse hook recess 35 when the locking element hangs normally from its pivot pin 37, but movable to enter the reverse hook recess and prevent forward rotation of the backrest part 4 about the pivot pin 5 without simultaneously rotating the element 29. The end of the locking element 36 is weighted at 39 so that in the event of rapid deceleration of the vehicle it is automatically swung forwardly by inertia to engage the nose 38 in the reverse hook recess 35. In an alternative arrangement a locking element may be spring-urged into a position in which its nose will engage the reverse hook recess and manual means may be provided to release it when it is desired to break the backrest part 4 forwardly.

What is claimed is:

1. A vehicle seat comprising a frame for mounting in a vehicle, a seat bottom part including a forward portion and a rearward portion and being mounted on the frame, a backrest part hingedly connected to the frame adjacent to said rearward portion of the seat bottom part so as to break forwardly about the hinged connection toward the forward portion of said seat bottom part from a normal position, including braking means connected between the backrest part and the seat bottom part for preventing forward movement of the backrest part about the hinged connection under forces equivalent to less than a predetermined maximum forward force applied to the top of the backrest part but to permit forward movement of the backrest part about the hinged connection under forces greater than said predetermined maximum forward force against a reaction provided by the braking means, said braking means including means for causing the reaction provided by the braking means to increase progressively as the permitted forward movement of the backrest part proceeds.

2. A vehicle seat as claimed in claim 1 including recline control means enabling a passenger in the seat to adjust the angular position of the backrest part relative to the seat bottom part about the hinged connection, said braking means being operatively connected to said recline control means.

3. A vehicle seat as claimed in claim 1 wherein the braking means includes means for providing little resistance to return movement of the backrest part after permitted forward movement.

4. A vehicle seat as claimed in claim 3 wherein the braking means includes locking means to prevent any further forward movement of the backrest part after it has been returned to its normal position after permitted forward movement.

5. A vehicle seat as claimed in claim 1 including a releasable connecting means between the braking means and the backrest part enabling the backrest part to be disconnected from the braking means so that it may be folded forwardly about the hinged connection.

6. A vehicle seat as claimed in claim 5 wherein the connecting means normally connects the backrest part to the braking means and may be disconnected when it is desired to fold the backrest part forwardly.

7. A vehicle seat as claimed in claim 5 wherein the connecting means is normally not connected between the braking means and the backrest part so that the backrest part may be folded forwardly when desired and the connecting device includes an inertia device responsive to abnormal forward deceleration of the seat to connect the braking means to the backrest part.

8. A vehicle seat as claimed in claim 1 in which the backrest part includes an upper portion, a lower portion, a front and a back, and means at the middle part of said lower portion of the back of the backrest part for preventing a significant force from being applied to the backrest part at the middle region of the lower portion of the back thereof.

9. A vehicle seat as claimed in claim 8 wherein said means comprises an aperture formed in the backrest part so that the knees of a passenger occupying a seat immediately behind may pass into the aperture.

10. A vehicle seat as claimed in claim 9 including a light surface element covering the aperture on one side of the backrest part, the said surface element being capable of deformation, detachment or fracture under impact from the knees of a passenger to enable them to pass through the aperture without applying significant force to the backrest part.

11. A vehicle seat comprising a frame for mounting in a vehicle, a seat bottom part including a forward portion and a rearward portion and being mounted on the frame, a backrest part hingedly connected to the frame adjacent to said rearward portion of the seat bottom part so as to break forwardly about the hinged connection toward the forward portion of said seat bottom part from a normal position, including braking means connected between the backrest part and the seat bottom part for preventing forward movement of the backrest part about the hinged connection under forces equivalent to less than a predetermined maximum forward force applied to the top of the backrest part but to permit forward movement of the backrest part about the hinged connection under forces greater than said predetermined maximum forward force against a reaction provided by the braking means, said braking means including means for causing the reaction provided by the braking means to increase progressively as the permitted forward movement of the backrest part proceeds, including recline control means enabling a passenger in the seat to adjust the angular position of the backrest part relative to the seat bottom part about the hinged connection, and wherein the braking means includes locking means to prevent any further forward movement of the backrest part after it has been returned to its normal position after permitted forward movement.

12. A vehicle seat as claimed in claim 11 including a releasable connecting means between the braking means and the backrest part enabling the backrest part to be disconnected from the braking means so that it may be folded forwardly about the hinged connection.

13. A vehicle seat as claimed in claim 12 wherein the connecting means normally connects the backrest part to the braking means and may be disconnected when it is desired to fold the backrest part forwardly.

14. A vehicle seat as claimed in claim 13 wherein the connecting means is normally not connected between the braking means and the backrest part so that the backrest part may be folded forwardly when desired and the connecting device includes an inertia device responsive to abnormal forward deceleration of the seat to connect the braking means to the backrest part.

15. A vehicle seat as claimed in claim 11 in which the backrest part includes an upper portion, a lower portion, a front and a back, and means at the middle part of said lower portion of the back of the backrest part for preventing a significant force from being applied to the backrest portion at the middle part of the lower portion of the back thereof.

16. A vehicle seat a claimed in claim 15 wherein said means comprises an aperture formed in the backrest part so that the knees of a passenger occupying a seat immediately behind may pass into the aperture.

17. A vehicle seat as claimed in claim 16 including a light surface element covering the aperture on one side ofthe backrest part, the said surface element being capable of deformation, detachment or fracture under impact from the knees of a passenger to enable them to pass through the aperture without applying significant force to the backrest part.

18. A braking device for connection between two part of a vehicle seat so as normally to prevent relative movement between the said parts under service forces below a predetermined level but designed to permit such relative movement under greater forces comprising, a sleeve and a deforming member for connection respectively to the two parts, the sleeve having a major portion and a minor portion at one end of the major portion, the minor portion having a transverse dimension different from any corresponding dimension of the major portion and concentrically engaging the deforming member, the sleeve and the deforming member being connected to said parts so that said service forces urge the deforming member towards the major portion of said sleeve but the engagement of the deforming member with the minor portion of said sleeve prevents significant movement of the deforming member towards the major portion of said sleeve, and said greater forces cause the deforming member to move from the minor portion of the sleeve towards and along the major portion of the sleeve thereby causing deformation of the sleeve, and locking means for engaging and locking the deforming member after it is returned to a position adjacent its initial position relative to the minor portion of said sleeve after movement under said greater forces so as to prevent any repeat movement along the major portion of said sleeve.

19. A braking device for connection between parts of a vehicle seat so as normally to prevent relative movement between the said parts under service forces below a predetermined level but designed to permit such relative movement under greater forces comprising, a sleeve having a major portion and an enlarged portion at one end of the major portion, and a head within and engaging the enlarged portion of said sleeve, said head having a transverse dimension greater than the major portion of said sleeve, the sleeve and the head being connected to said parts so that said service forces urge the heads towards the major portion of said sleeve but the engagement between said head and said sleeve preventing significant movement of the head towards the major portion of the sleeve, and said greater forces cause the head to move from the enlarged portion of the sleeve towards and along the major portion of said sleeve causing expansion of the major portion of the sleeve, and locking means for engaging and locking said head after it is returned to a position adjacent its initial position within said enlarged portion of the sleeve after movement under said greater forces so as to prevent any repeat movement along said major portion of the sleeve.

* * * * *